Oct. 28, 1952     K. E. LYMAN     2,615,710

SINGLE LEAF SPRING SUSPENSION FOR AUTOMOBILES

Filed June 14, 1947

INVENTOR.
KENNETH E. LYMAN
BY
Toulmin & Toulmin
ATTORNEYS

Patented Oct. 28, 1952

2,615,710

UNITED STATES PATENT OFFICE 2,615,710

SINGLE LEAF SPRING SUSPENSION FOR AUTOMOBILES

Kenneth E. Lyman, Lake Forest, Ill., assignor to Tucker Corporation, Chicago, Ill., a corporation of Delaware Application June 14, 1947, Serial No. 754,743

2 Claims. (Cl. 267—41)

The present invention has to do with the suspension of a chassis from the wheels of a motor vehicle, and is concerned primarily with a novel spring arrangement for achieving this end.

A motor vehicle, such as the present day automobile, ordinarily includes four wheels and a chassis which is suspended by, or supported, from these wheels. In accordance with certain recent developments in the field of automotive engineering, there is a marked trend toward the use of individual so-called parallelogram suspensions for supporting each corner of the chassis from the respective wheel. A parallelogram suspension of this type is characterized by the presence of spaced horizontal arms which are anchored at one end to the bearing block of the wheel, and at the other end to the chassis. It has been the practice to either associate torsion springs with the parallelogram suspension, or employ spring arms for the horizontal members which define the parallelogram. The present invention is concerned primarily with a novel parallelogram suspension of this general type.

The invention has in view as its foremost objective, the provision, in an automobile including a chassis and a wheel, of a parallelogram suspension comprising spaced horizontal arms, each of which consists of a pair of leaf springs which are anchored at one end to the bearing block of the wheel, and which are spaced apart at their other ends and anchored to the vehicle chassis.

With a construction designed in accordance with the above-noted objective, it is evident that the actual mass of the structural elements of the parallelogram suspension is held down to a minimum. At the same time, all the advantages of a horizontal arm of wide expanse are obtained by anchoring the inner ends of the spring arms to the chassis at points spaced horizontally apart, and good stability is achieved without any increase in weight.

A further object of the invention is to provide in a parallelogram suspension of the type indicated, a single leaf spring arm which is weakest at its center, and gradually increases in strength and dimensions towards each end. Such a structure readily lends itself to providing the spring action which is so essential to good riding qualities.

Still another object of the invention is the provision of a new and improved method for supporting a vehicle chassis from the vehicle wheels. This method is characterized by the inclusion of the steps of individually connecting each wheel to the chassis by a parallelogram support and spacing the anchorage of the supporting arms a greater distance apart at the connections to the chassis, than at the connections to the wheel.

Various other more detailed objects and advantages of the invention such as arise in connection with carrying out the above-noted thoughts in a practical embodiment, will in part become apparent and in part be hereinafter stated as the description of the invention proceeds.

The invention therefore comprises a single leaf spring parallelogram suspension for an automobile which comprises a parallelogram support consisting of a pair of spaced horizontal arm assemblies, each of which includes a pair of single leaf spring arms that are joined together at one end, and anchored to the bearing block of the wheel, and spaced apart at the other end and anchored to the vehicle chassis.

The invention also embraces the method of supporting a chassis from vehicle wheels which lies in the connection of the wheels to the chassis by parallelogram suspension arms having leaf spring elements that are spaced apart more widely at the chassis than at the connections for the wheels.

For a fully and more complete understanding of the invention reference may be had to the following description and accompanying drawing wherein:

Figure 1 is a view in side elevation of a parallelogram suspension embodying the principles of this invention, and shown as connecting a chassis to a vehicle wheel, and Figure 2 is a plan view of the suspension shown in Figure 1.

Referring now to the drawing, wherein like reference characters denote corresponding parts, a wheel is depicted somewhat diagrammatically, and is represented in its entirety by the reference character W. The wheel W includes a bearing block designated 10, which receives the axle (not illustrated) on which the wheel rotates.

A vehicle chassis is designated generally C, and is illustrated as including a side channel bar 11, having an upper horizontal flange 12, and a lower flange 13. A pair of brackets are depicted at B and B¹. These brackets are substantially duplicates, and only one of them need here be described for the purposes of this specification. Each of the brackets B and B¹ includes a bottom flange 14, which engages the upper flange 12 of the channel bar 11, and is bolted thereto as by the headed bolts shown at 15. Each bracket B also includes a vertical flange 16 which constitutes substantially a continuation of the main part of the channel bar 11.

A parallelogram suspension is referred to in its entirety by the reference character P. This suspension comprises an upper arm assembly designated U, and a horizontal arm assembly designated L. The arm assemblies U and L are substantially duplicates, each of them comprises a pair of spring arms 17 and 18. It will be noted that these arms 17 and 18 are weakest at their mid-points 19 due to the narrowest construction thereat. While the arms 17 and 18 are substantially uniform in thickness, they vary in width, increasing from the narrow center 19 towards the wider structure at each end.

The leaf springs 17 and 18 of the suspension arm assembly U, converge and meet on the upper face of the bearing block 10, to which they are anchored as by the headed bolts shown at 20. The ends remote from this anchorage 20 are spaced apart as clearly shown in Figure 2, and anchored in this spaced relation to the brackets B, that are carried on the chassis C. This is accomplished through the medium of a pair of L-shaped connecting members 21 and 22. Each of these members 21 and 22 has a vertical flange 23, that is anchored to the vertical flange 16 of the respective brackets B or B¹ by the bolt and nut connection shown at 24. The connecting member 21 includes a horizontal flange 25, to which the inner end of the spring 17 of the upper arm assembly U is secured as by the bolt and nut shown at 26. Similarly, the connecting member 22 is formed with a horizontal flange 27, to which the inner end of the arm 18 is secured by a bolt and nut connection 28.

The lower arm assembly L is incorporated into this structure in substantially the same manner. The outer ends of the spring arms of this member converge and are secured to the underface of the bearing block 10 as by the bolt shown at 29. The inner ends are spaced apart and secured to the chassis C by L-shaped connecting members shown at 30.

While the operation of the above-described mechanism is believed to be obvious, it will be noted that the arms U and L of the parallelogram suspension P, being of a resilient construction, permit the wheels W to move vertically with respect to the chassis C. During this movement, the wheel W is held in a vertical position due to the spacing between the upper and lower arms. Moreover, great stability in the entire structure is obtained due to the wide spacing of the inner ends of the arms 17 and 18 where they are connected to the chassis.

If desired, tie-in devices shown at T may be employed for the purpose of joining the mid-points of the corresponding spring arms 17 and 18 of upper and lower assemblies, respectively. This one device T connects the mid-points 19 of the arm 17 while another device joins the mid-points 19 of the arm 18.

While a preferred specific embodiment of the invention is hereinbefore set forth, it is to be clearly understood that the invention is not to be limited to the exact construction illustrated and described, because various modifications of these details may be provided in putting the invention into practice within the purview of the appended claims.

What is claimed is:

1. In an automobile including a wheel, a bearing block supported by the wheel and a chassis, a parallelogram suspension for suspending said chassis from said wheel, said suspension comprising spaced brackets secured to said chassis, an upper arm assembly consisting of a pair of straight elongated single leaf springs arranged in diverging relation with their outer ends meeting and connected rigidly to the upper face of said block and their inner ends spaced apart and connected rigidly to said brackets, and a lower arm assembly consisting of a pair of straight elongated single leaf springs arranged in diverging relation with their outer ends meeting and joined rigidly to the under face of said block and their inner ends connected rigidly to said chassis at spaced points, each of said leaf springs being of substantially uniform thickness, but of varying width and having its narrowest point at its center and gradually increasing in width towards each end away therefrom.

2. In an automobile including a wheel, a bearing block supported by the wheel and a chassis, a parallelogram suspension for suspending said chassis from said wheel, said suspension comprising spaced brackets secured to said chassis, an upper arm assembly consisting of a pair of straight elongated single leaf springs arranged in diverging relation with their outer ends meeting and connected rigidly to the upper face of said block and their inner ends spaced apart and connected rigidly to said brackets, a lower arm assembly consisting of a pair of straight elongated single leaf springs arranged in diverging relation with their outer ends meeting and joined rigidly to the under face of said block and their inner ends connected rigidly to said chassis at spaced points, the springs tapering in width toward their centers to be weakest at their centers, and a pair of tie-in devices connecting the centers of the corresponding springs in said upper and lower assemblies.

KENNETH E. LYMAN.

REFERENCES CITED

The following references are of record in the file of this patent:

UNITED STATES PATENTS

| Number | Name | Date |
| --- | --- | --- |
| 1,166,616 | Mason et al. | Jan. 4, 1916 |
| 1,324,440 | Ackerman | Dec. 9, 1919 |
| 1,563,952 | Barker | Dec. 1, 1925 |
| 1,815,437 | Josephs | July 21, 1931 |
| 1,833,405 | Bock et al. | Nov. 24, 1931 |
| 1,864,625 | Wells | June 28, 1932 |
| 2,458,548 | Aronson | Jan. 11, 1949 |

FOREIGN PATENTS

| Number | Country | Date |
| --- | --- | --- |
| 113,345 | Great Britain | Feb. 21, 1918 |
| 321,640 | Great Britain | Nov. 7, 1929 |
| 541,215 | Germany | Jan. 12, 1933 |